United States Patent
Wu et al.

(10) Patent No.: US 9,810,839 B2
(45) Date of Patent: Nov. 7, 2017

(54) CONTROLLED TUNNELING WAVEGUIDE INTEGRATION (CTWI) FOR EFFECTIVE COUPLING BETWEEN DIFFERENT COMPONENTS IN A PHOTONIC CHIP

(71) Applicant: ArtIC Photonics Inc., Ottawa (CA)

(72) Inventors: Fang Wu, Ottawa (CA); Yury Logvin, Ottawa (CA); Kirill Y. Pimenov, Ottawa (CA); Christopher D. Watson, Ottawa (CA); Yongbo Tang, Ottawa (CA)

(73) Assignee: Artic Photonics Inc., Ontario (CA)

( * ) Notice: Subject to any disclaimer, the term of this patent is extended or adjusted under 35 U.S.C. 154(b) by 0 days.

(21) Appl. No.: 15/063,722

(22) Filed: Mar. 8, 2016

(65) Prior Publication Data

US 2016/0327741 A1    Nov. 10, 2016

Related U.S. Application Data

(60) Provisional application No. 62/130,334, filed on Mar. 9, 2015.

(51) Int. Cl.
*G02B 6/00* (2006.01)
*G02B 6/125* (2006.01)
(Continued)

(52) U.S. Cl.
CPC ......... *G02B 6/125* (2013.01); *G02B 6/12002* (2013.01); *G02B 6/124* (2013.01);
(Continued)

(58) Field of Classification Search
None
See application file for complete search history.

(56) References Cited

U.S. PATENT DOCUMENTS 7,532,784 B2* 5/2009 Tolshikhin ......... G02B 6/12007
385/14
9,335,475 B2* 5/2016 Ono ........................ G02B 6/34
(Continued)

OTHER PUBLICATIONS

Dreisow, F. et al., "Adiabatic transfer of light via a continuum in optical waveguides," Optics Letters, vol. 34, No. 16, pp. 2405-2407, Aug. 15, 2009.
(Continued)

*Primary Examiner* — Sung Pak
(74) *Attorney, Agent, or Firm* — Seyfarth Shaw LLP (57) ABSTRACT

The invention describes an integrated photonics platform comprising a plurality of at least three vertically-stacked waveguides which enables light transfer from one waveguide of the photonic structure into another waveguide by means of controlled tunneling method. The light transfer involves at least three waveguides wherein light power flows from initial waveguide into the final waveguide while tunneling through the intermediate ones. As an exemplary realization of the controlled tunneling waveguide integration, the invention describes a photonic integrated structure consisting of laser guide as upper waveguide, passive guide as middle waveguide, and modulator guide as lower waveguides. Controlled tunneling is enabled by the overlapped lateral tapers formed on the same or different vertical waveguide levels. In the further embodiments, the controlled tunneling platform is modified to implement wavelength-(de)multiplexing, polarization-splitting and beam-splitting functions.

22 Claims, 10 Drawing Sheets

(51) Int. Cl.

| | | |
|---|---|---|
| G02B 6/136 | (2006.01) | |
| H04B 10/2507 | (2013.01) | |
| H04B 10/2581 | (2013.01) | |
| G02B 6/12 | (2006.01) | |
| G02B 6/122 | (2006.01) | |
| G02B 6/124 | (2006.01) | |
| G02B 6/126 | (2006.01) | |
| G02B 6/13 | (2006.01) | |

(52) U.S. Cl.
CPC ........... *G02B 6/126* (2013.01); *G02B 6/1228* (2013.01); *G02B 6/131* (2013.01); *G02B 6/136* (2013.01); *H04B 10/2507* (2013.01); *H04B 10/2581* (2013.01); *G02B 2006/1215* (2013.01); *G02B 2006/12038* (2013.01); *G02B 2006/12061* (2013.01); *G02B 2006/12078* (2013.01); *G02B 2006/12121* (2013.01); *G02B 2006/12128* (2013.01); *G02B 2006/12142* (2013.01); *G02B 2006/12147* (2013.01); *G02B 2006/12164* (2013.01)

(56) References Cited

U.S. PATENT DOCUMENTS

| | | | | |
|---|---|---|---|---|
| 2004/0017976 A1* | 1/2004 | Luo | ........................ | G02B 6/1228 385/43 |
| 2013/0170793 A1* | 7/2013 | Ushida | .................. | G02B 6/1228 385/43 |
| 2015/0260913 A1* | 9/2015 | Li | ....................... | G02B 6/12004 385/14 |

OTHER PUBLICATIONS

Hristova, H.S. et al., "Adiabatic evolution of light in an array of parallel curved optical waveguides," Physical Review, A 88, pp. 013808-1/013808-5, (2013).

Longhi, S., "Coherent transfer by adiabatic passage in two-dimensional lattices," Annals of Physics, (2014), http://dx.doi.org/10.1016/j.aop.2014.05.020.

Longhi, S. et al., "Coherent tunneling by adiabatic passage in an optical waveguide system," Physical Review, B 76, pp. 201101-1/201101-4, (2007).

Paspalakis, E., "Adiabatic three-waveguide directional coupler," Optics Communications 258, pp. 30-34, (2006).

Socci, L., et al., "300nm bandwidth adiabatic SOI polarization splitter-rotators exploiting continuous symmetry breaking," Optics Express, vol. 23, No. 15, 11 pgs., Jul. 27, 2015.

Hope, A. P., et al., "Long-range coupling of silicon photonic waveguides using lateral leakage and adiabatic passage," Optics Express, vol. 21, Issue No. 19, pp. 22705-22716, Sep. 23, 2013.

Tsarev, A. V. et al., "Analysis of light propagation for crossing of thin silicon wires using vertical tunnelling coupling with a thick optical channed waveguide," Quantum Electronics, vol. 43, Issue No. 8, pp. 744-750, Aug. 31, 2013.

Menchon-Enrich, R., et al. "Adiabatic passage of light in CMOS-compatible silicon oxide integrated rib waveguides," IEEE Photonics Technology Letters vol. 24, Issue No. 7, pp. 536-538, Apr. 1, 2012.

Chung, K. et al., "Broadband and robust optical waveguide devices using coherent tunneling adiabatic passage," Optics Express, vol. 20, Issue No. 21, pp. 23108-23116, Sep. 24, 2012.

Menchon-Enrich, R., et al. "Light spectral filtering based on spatial adiabatic passage," Light: Science & Applications, vol. 2, Issue No. 8, 8 pgs. Aug. 6, 2013.

Hope, A. P., et al., "Adiabatic optical bus for long-range coupling between silicon photonic waveguides," Proc. SPIE 9133, Silicon Photonics and Photonic Integrated Circuits IV, 913301, May 1, 2014.

International Search Report, dated Jun. 1, 2016, 12 pages.

* cited by examiner

CONTROLLED TUNNELING WAVEGUIDE INTEGRATION (CTWI) FOR EFFECTIVE COUPLING BETWEEN DIFFERENT COMPONENTS IN A PHOTONIC CHIP

This application claims priority based on U.S. Application No. 62/130,334 entitled "CONTROLLED TUNNELING WAVEGUIDE INTEGRATION (CTWI) FOR EFFECTIVE COUPLING BETWEEN DIFFERENT COMPONENTS IN A PHOTONIC CHIP" filed Mar. 9, 2015, which is herein incorporated by reference.

FIELD OF THE INVENTION

The invention relates to the field of photonic integrated circuits (PIC), and in particular, to the integrated PIC platforms based on multiple vertical waveguide structures.

BACKGROUND OF THE INVENTION

In modern telecommunication industry based on optical fiber interfaces, the cost of optoelectronics components is a key factor for the deployment of the next generation optical links. As response to this challenge, the photonic integrated circuits (PIC) technology is regarded as very promising approach because it offers the benefit of combining different functions such as light generation, amplification, processing and detection in most cost-efficient way. At the same time, in any PIC development the key difficulty is the accommodation of active components having different bandgaps, such as lasers, modulators or detectors on a single chip. One integration technique that achieves this aim places the device waveguides, one under another in a vertical epi-stack. In this case, however, the design of the PIC is complicated, from one side, by the conflicting requirements of layer isolation, so that device functions can be optimized, and from another side, by the need of communication between the layers, so that optical circuits can be made.

Usually, to address these difficulties, a passive guide is inserted between the active devices to achieve isolation, and then lateral tapers are used at each guiding layer so that the light from the upper active waveguide is transferred to the intermediate passive waveguide followed by another transition into the lower active waveguide. Such approach is extensively used in the previous art and described in a number of patents (e.g. S. Saini et al, "Resonantly coupled waveguides using a taper", U.S. Pat. No. 6,310,995, S. Forrest, M. Gokhale and P. Studenkov "Twin waveguide based design for photonic integrated circuits", U.S. Pat. No. 6,381,380, S. Forrest et al, "Photonic integrated detector having a plurality of asymmetric waveguides" U.S. Pat. No. 6,330,378).

Figure 1:
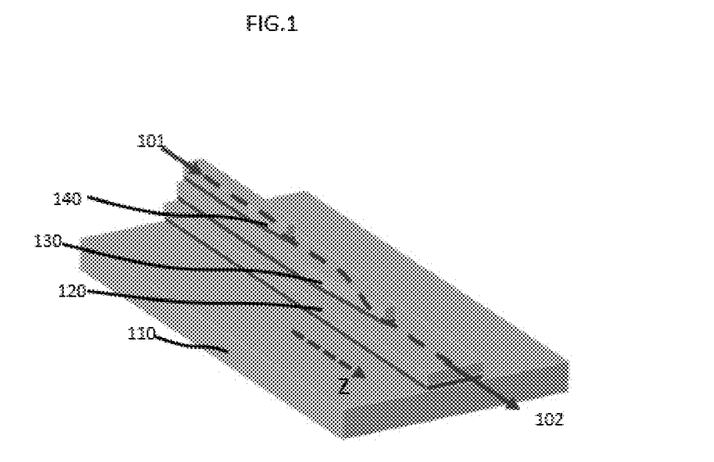
FIG. 1 illustrates prior art in the form of triple-guide structure in which lateral tapers are spatially separated one from another and the light transfer occurs only between adjacent waveguide in the vertical stack.

The specific feature of this approach is that the both upper and lower waveguides only interact with the middle waveguide, the middle waveguide bridges the two waveguides, at the same time isolates them as is illustrated in FIG. 1 *a*). While this strategy addresses the needs of both isolation and communication, the intermediate passive waveguide must have the strength, i.e., effective index, that lies between the upper and lower active waveguide ones. The requirement on the middle waveguide strength introduces additional constraints to the optimization of the active waveguides. For example, it imposes limitations on the achievable confinement factor of the device waveguide, which is an extremely important parameter for efficient lasers and modulators.

The design approach existing in the prior art assumes that light is transferred only between adjacent guiding layers of the vertical stack what in turn implies the geometry that the waveguide tapers on different levels should be separated in space; otherwise one transfer would be in conflict with another one. Such geometrical constraint inevitably increases the chip's footprint and leads to higher chip's cost.

Therefore, there is a need in the art of multi-guide PIC technology to lift limitations of light interaction only between adjacent waveguides; there is a need to provide solution when light signal could be efficiently redirected from one vertical layer of the stack into any other desirable vertical waveguide.

Therefore, there is a further need in the art to provide solution of (de)multiplexing signals of different wavelength when light signal of desired wavelength could be efficiently redirected from one vertical layer of the stack into any other desirable vertical waveguide.

Therefore, there is a further need in the art to provide solution of power splitting when the power of the light signal being initially localized in one particular waveguide of the vertical stack could be efficiently redistributed between several vertical waveguides of the stack in desired ratio.

Figure 2:
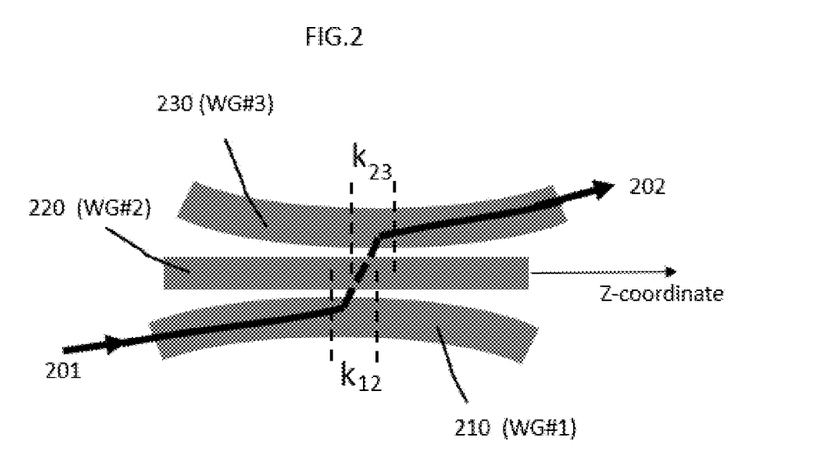
FIG. 2 gives a schematic view of three lateral waveguides where optical coupling denoted as $k_{12}(z)$ and $k_{23}(z)$ is controlled by separation between the waveguides.
Figure 3:
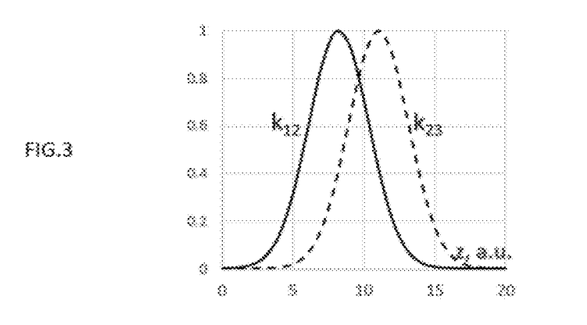
FIG. 3 gives explicit dependence of the coupling coefficients $k_{12}(z)$ and $k_{23}(z)$ versus z-coordinate.

Generic case of light propagation in a planar structure of three or more coupled optical waveguides, illustrated in FIG. 2, is well studied in the literature [E. Paspalakis, "Adiabatic three-waveguide directional coupler," Opt. Commun. 258, 30-34 (2006); S. Longhi, G. Della Valle, M. Ornigotti, and P. Laporta, "Coherent tunneling by adiabatic passage in an optical waveguide system," Phys. Rev. B 76, 201101 (2007); H. S. Hristova, A. A. Rangelov, S. Gu'erin, and N. V. Vitanov "Adiabatic evolution of light in an array of parallel curved optical waveguides" Phys. Rev. A 88, 013808 (2013)]. In the theory which is based on the slowly varying envelope approximation, the spatial evolution of the amplitudes of the optical modes $a_n(z)$, with n=1, 2, 3, is described by the following set of coupled differential equations $$-i\frac{da_1}{dz} = \beta_1 a_1(z) + k_{12}(z)a_2(z), \quad (1)$$

$$-i\frac{da_2}{dz} = \beta_2 a_2(z) + k_{21}(z)a_1(z) + k_{23}(z)a_3(z), \quad (2)$$

$$-i\frac{da_3}{dz} = \beta_3 a_1(z) + k_{32}(z)a_2(z), \quad (3)$$

where, $\beta_n$ with n=1, 2, 3, is the constant propagation coefficient of the nth waveguide and $k_{nm}(z)$, with n,m=1, 2, 3 is the variable coupling coefficient between the waveguides n and m. It was found that when the coupling between planar waveguides has a specific dependence on the propagation coordinate z, as illustrated in FIG. 3, then the transfer from the outermost waveguide into another one occurs via so-called tunneling mechanism. A distinctive feature of this mechanism is that light does not delay in the middle waveguide and goes directly from one outermost waveguide into another one. This coupling mechanism has been termed as a coherent tunneling by adiabatic passage (CTAP) [E. Paspalakis, "Adiabatic three-waveguide directional coupler," Opt. Commun. Vol. 258, 30-34 (2006); S. Longhi, G. Della Valle, M. Ornigotti, and P. Laporta, "Coherent tunneling by adiabatic passage in an optical waveguide system," Phys. Rev. B Vol. 76, pp. 201101-201105 (2007).].

Figure 4:
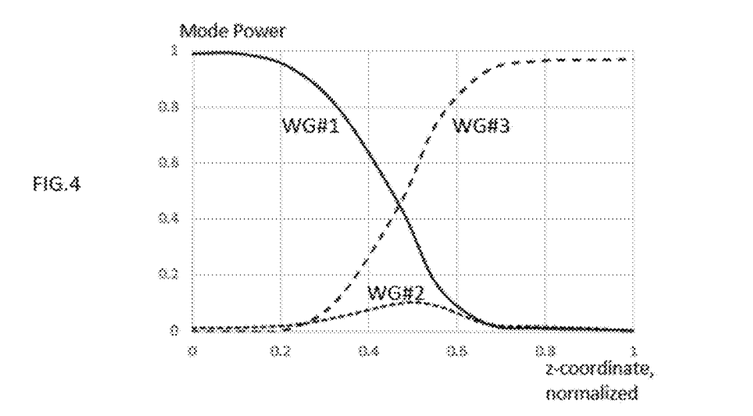
FIG. 4 shows mode power evolution along z-coordinate for the system of three waveguides in the case of CTAP mechanism.

FIG. 4 presents further details of the CTAP mechanism, showing that light stays mainly in the modes of waveguides #1 and #3 without significant excitation of the mode in waveguide #2.

Figure 5:
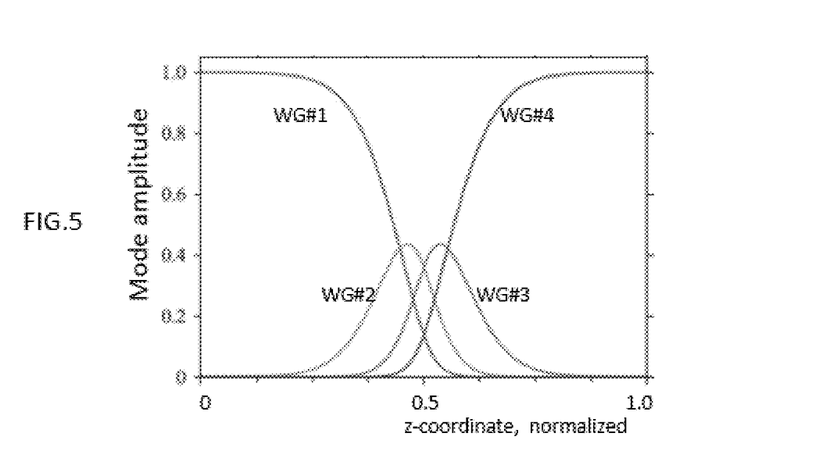
FIG. 5 shows mode power evolution along z-coordinate for the system of four waveguides in the case of CTAP mechanism.

CTAP light exchange mechanism may be extended to the larger number of coupled waveguides as it is demonstrated in the work by H. S. Hristova, A. A. Rangelov, S. Gu'erin, and N. V. Vitanov "Adiabatic evolution of light in an array of parallel curved optical waveguides" Phys. Rev. A Vol. 88, 013808-013811 (2013). FIG. 5 shows light exchange between outermost waveguides in the four waveguide array. It is seen that light goes from one outermost waveguide to another outermost waveguide with only partial excitation of intermediate waveguides.

The CTAP formalism involving coupling between three states described by equations (1)-(3) is relevant to many physical applications in different fields of science and technology; one such application is controlling the population of quantum states of atoms and molecules by external laser pulses as it is described in the US patent by S. Nakatuura, K. Ichimura and H. Goto "Operating method for stimulated Raman adiabatic passage and operating method for phase gate" U.S. Pat. No. 8,488,232 B2.

The CTAP concept has been applied to Silicon-on-Insulator (SoI) platform with the result that light modes can be efficiently transferred between two lateral waveguides with help of third mode which is the silicon slab mode or the supermode of the full structure. [A. P. Hope, T. G. Nguyen, A. D. Greentree, A. Mitchell, "Long-range coupling of silicon photonic waveguides using lateral leakage and adiabatic passage" Opt. Express, Vol. 21, pp. 22705-22716 (2013), L. Socci, V. Sorianello, and M. Romagnoli, "300 nm bandwidth adiabatic SOI polarization splitter-rotators exploiting continuous symmetry breaking" Opt. Express, Vol. 23, pp. 1926149271 (2015).]. However, the planar nature of the SoI platform does not allow application of three-dimensional potential of the CTAP approach, whereas the semiconductor multi-layered structures are very good candidate for realization of all CTAP mechanism benefits.

While the theoretical background of efficient light transfer between different waveguides in the array is well elaborated, the application of the CTAP theory to the field of the vertical photonic integration is still missing. The current invention exploits the concept of controlled tunneling waveguide integration (CTWI) to develop multiple vertical/lateral waveguide platform suitable for cost-efficient PIC fabrication.

SUMMARY OF THE INVENTION

The present invention describes multi-guide PIC platform which is designed according to the concept of controlled tunneling waveguide integration (CTWI) for the purpose of efficient light transfer between different waveguides of the PIC-structure.

Namely, according to a first aspect of the invention, the vertical triple tapered-waveguide PIC platform with upper and lower waveguide being active waveguides and the middle waveguide being passive waveguide is provided. The combination of the lateral tapers allows direct transfer of light from one active waveguide into another one whilst bypassing the middle guide.

According to another aspect of the invention, the multi-guide structure with four or more waveguides is provided in which the light signal is transferred from one outermost waveguide directly into another outermost waveguide by combination of lateral tapers on different waveguide levels. Light transfer between waveguides can also be used to form beam power splitter with arbitrary splitting ratio in each of the waveguides.

According to another aspect of the invention, the multi-guide PIC structure is provided in which (de)multiplexing function is realized by means of the CTWI mechanism; namely, from several optical signals having different carrier wavelength only the signal with particular wavelength is transferred into designated waveguide of the stack while all other signals stay in the original waveguide.

According to another aspect of the invention, the PIC platform is provided, in which two active waveguides are disposed parallel to each other on top of wider multi-waveguide structure, wherein light from first active waveguide is tunneling down to lower passive waveguide and then is tunneling laterally through one or more other passive waveguides, and finally is transferred into second upper active waveguide.

BRIEF DESCRIPTION OF THE DRAWINGS

The present invention, together with objects, features and advantages thereof, may best be understood by reference to the following description of the drawings in which.

DETAILED DESCRIPTION OF EMBODIMENTS OF THE INVENTION

Preferred embodiments of the present invention will be described below with reference to FIGS. 1-15.

It is instructive to start description with review of the previous art which is illustrated in FIG. 1 by using the triple-guide structure as an example. Here, three vertical waveguides are formed on the substrate 110. In the case of FIG. 1, light signal 101 which is launched into upper waveguide 140 is transferred with the help of the lateral taper into the middle waveguide 130. After propagating in the middle waveguide 130, the signal is transferred into lower guide 120 by the use of another lateral taper. The distinctive feature of this approach, described in number of patents (e.g. S. Saini et al, "Resonantly coupled waveguides using a taper", U.S. Pat. No. 6,310,995, S. Forrest, M. Gokhale and P. Studenkov "Twin waveguide based design for photonic integrated circuits", U.S. Pat. No. 6,381,380, S. Forrest et al, "Photonic integrated detector having a plurality of asymmetric waveguides" U.S. Pat. No. 6,330,378) is that light is transferred only between two adjacent waveguides, what limits functionality. The tapers should be separated spatially what increases PIC chip size and leads to higher cost. In addition, there are design constraints imposed on the active device characteristics by the requirement from the middle waveguide to have certain refractive index. Before considering the matter of present invention overcoming above shortcomings, it is instructive to consider some aspects of general theory of light propagation in the array of coupled waveguides what is discussed in the context of next figures.

FIG. 2 presents a schematic view of three lateral waveguides where the separation between waveguides varies with z-coordinate. When light signal 201 is launched into the waveguide 210 (denoted also as WG#1), first it propagates in this waveguide without interacting with other waveguides, but when the waveguide 210 approaches the waveguide 220 (denoted also as WG#2) the optical coupling establishes between the waveguides and light signal can penetrate from waveguide 210 into waveguide 220. The optical coupling between waveguide 210 and waveguide 220 is denoted by $k_{12}(z)$ in FIG. 2 and its explicit form is given in FIG. 3. Shown in FIG. 3 is also the coupling coefficient $k_{23}(z)$ between waveguide 220 into waveguide 230 (denoted also as WG#3). Two coupling coefficients are overlapping with each other such that light signal after being transferred from waveguide 210 into waveguide 220 can penetrate further into waveguide 230 what is marked by the dashed line in FIG. 2. It was found in the general studies of light propagation in the array of coupled waveguides that light coupling can occur according to a special mechanism termed as coherent tunneling by adiabatic passage (CTAP) mechanism when coupling coefficients have bell-like shapes and they are overlapped one with respect to another in a way shown in FIG. 3. [E. Paspalakis, "Adiabatic three-waveguide directional coupler," Opt. Commun. 258, 30-34 (2006); S. Longhi, G. Della Valle, M. Ornigotti, and P. Laporta, "Coherent tunneling by adiabatic passage in an optical waveguide system," Phys. Rev. B 76, 201101 (2007)]. In the case of CTAP mechanism, light goes directly from the waveguide 210 (WG#1) into waveguide 230 (WG#3) while excitation of the modes of the waveguide 220 (WG#2) is quite negligible. This direct light transition from the waveguide 210 (WG#1) into waveguide 230 (WG#3) is illustrated in FIG. 4 where evolution of light power decomposed into modes of different waveguides is presented. At the start of propagation total power is localized in WG#1; after propagation along z-coordinate, light starts leaking into WG#2, but the transfer into WG#3 prevails such that the whole power of the signal ends up in the WG#3 at the end of propagation. Similar situation occurs in the array of four coupled waveguides when coupling coefficients are adjusted according to CTAP mechanism; in this case light goes directly from the outermost waveguide WG#1 to the opposite waveguide WG#4, spatial evolution of the mode amplitudes is presented in FIG. 5 according to the study by H. S. Hristova, A. A. Rangelov, S. Gu'erin, and N. V. Vitanov "Adiabatic evolution of light in an array of parallel curved optical waveguides" Phys. Rev. A Vol. 88, 013808-013811 (2013).

The present invention applies the above-described CTAP mechanism to the case of light transfer in the 3-dimensional multi-waveguide PIC epi-structure. The use of this mechanism allows multiple functions to be realized within the platform which is termed in the following as the controlled tunneling waveguide integration (CTWI) platform. The first embodiment of the CTWI platform is presented in FIG. 6A. The structure, like in the case of FIG. 1, comprises the substrate 610 on top of which three waveguides 620 (WG#3), 630 (WG#2) and 640 (WG#1) are formed. The principal distinction from the case of FIG. 1 is that here lateral tapers within 630 and 640 waveguides are superimposed in z-direction. The light signal 601 which is launched into upper waveguide 640 is transferred directly to the lower waveguide 620 without delaying in the middle waveguide 630.

Figure 6A:
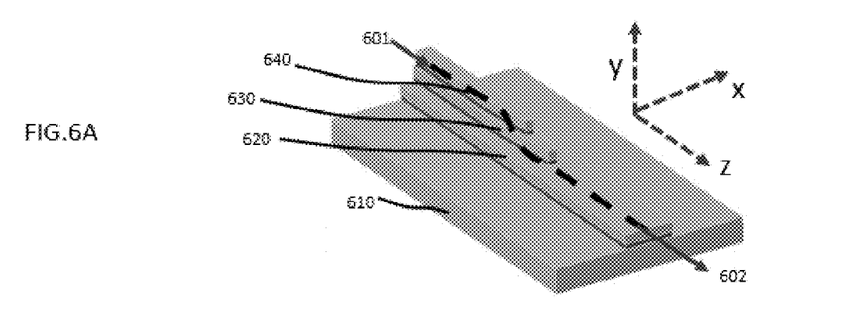
FIG. 6A gives a schematic view of the embodiment of the invention in form of triple-guide structure designed according to CTWI approach and where lateral tapers are overlapped in z-direction.
Figure 6B:
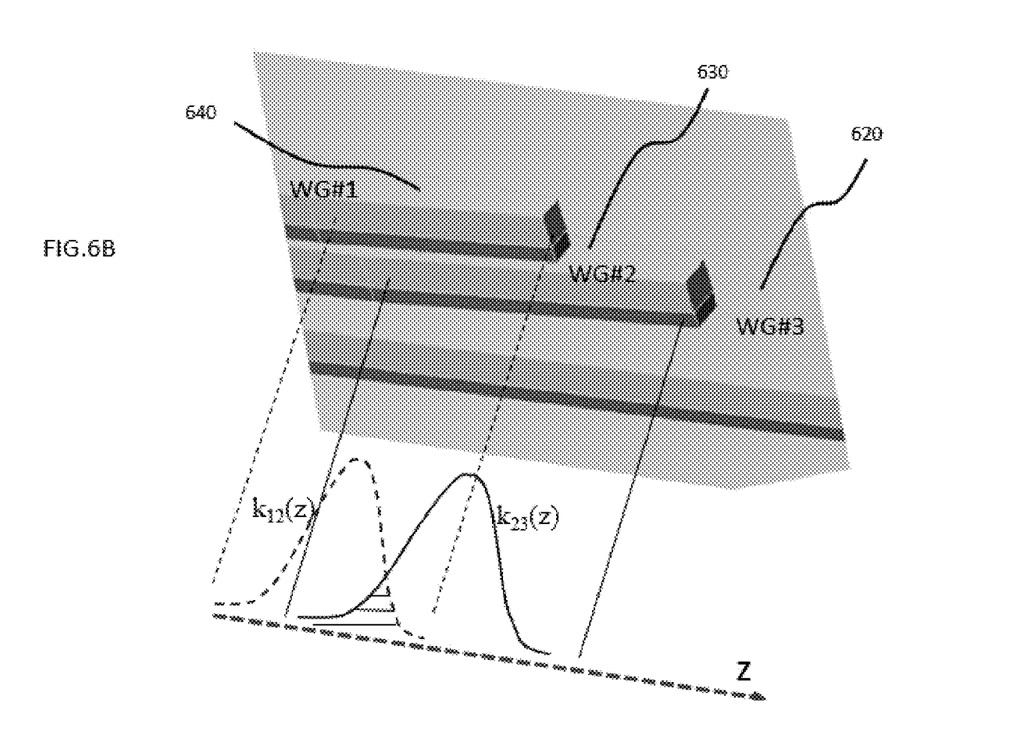
FIG. 6B provides details of the tapered section of the structure of FIG. 6A with the coupling coefficient profiles $k_{12}(z)$ and $k_{23}(z)$ aligned with the corresponding tapers. Overlap of two profiles is marked as dashed area.

The coupling between vertical waveguides in the structure of FIG. 6A is realized by means of lateral tapers whose enlarged view is presented in FIG. 6B. The superposition of two tapers in z-direction in FIG. 6B corresponds to the overlap of the coupling coefficients shown in FIG. 3. When considering excitation of partial modes of three waveguides along z-coordinate, the same plots which are presented in FIG. 4 are relevant. The mode of the middle waveguide 630 is only slightly excited like it is shown for the WG#2 in FIG. 4. It is worth to emphasize that in the prior structure of FIG. 1 the coupling regions are well separated in z-direction what corresponds to the absence of the overlap for two coupling profiles of FIG. 3 and of FIG. 6B.

Figure 7:
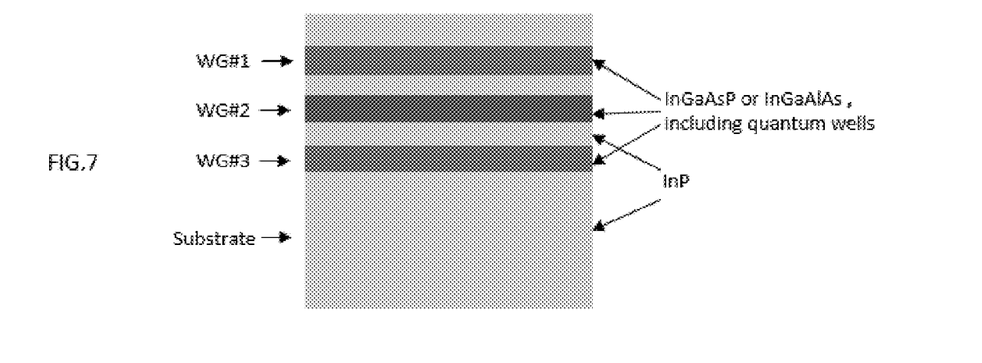
FIG. 7 presents a sectional view of InP based epi-structure of three vertical waveguides in accordance with an aspect of the invention.

FIG. 7 provides an example of the epitaxial structure corresponding to three vertical waveguides of FIG. 6A. Here, the epitaxial layers are deposited on top of the InP substrate and the vertical waveguides are formed by the layers of InGaAsP or InGaAsAl materials.

Figure 8:
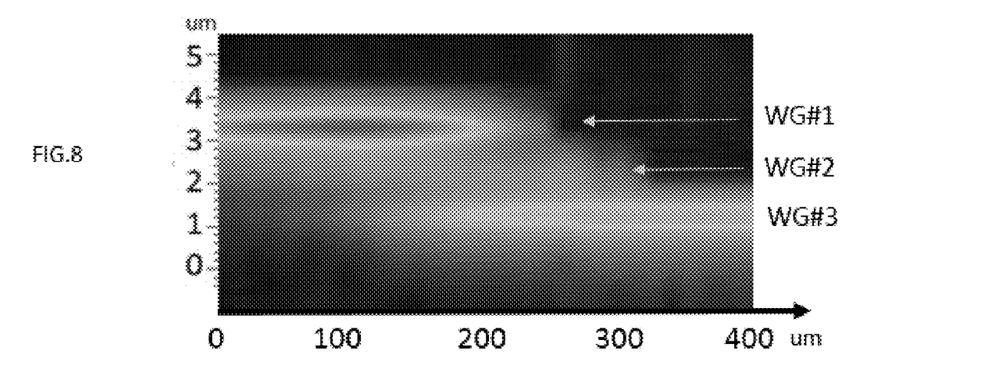
FIG. 8 is a graphical representation of the light intensity as a function of distance in a triple-waveguide tapered structure of FIG. 6A.

FIG. 8 presents results of simulations obtained by using 3D beam propagation method for the CTWI structure of FIG. 6A comprising epi-layers of FIG. 7. The results demonstrate light intensity distribution within YZ-plane of FIG. 6A. Light signal is launched into upper waveguide (WG#1) and is transferred into lower waveguide (WG#3) whilst bypassing the middle waveguide (WG#2). The length in z-direction occupied by two overlapped tapers is about 200 um what is significantly shorter compared to the case of the decoupled tapers.

Figure 9:
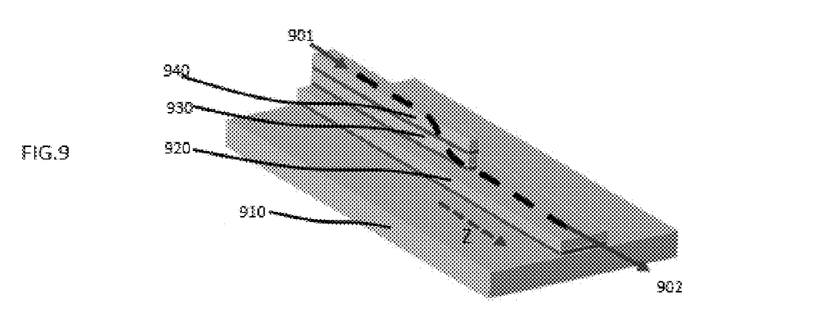
FIG. 9 presents a schematic view of another embodiment of the invention in form of triple-guide structure when two lateral tapers formed on two vertical levels are precisely overlapped.

FIG. 9 illustrates another embodiment of the CTWI triple-ridge structure. When compared to the embodiment of FIG. 6A, here two tapers are completely overlapped such that coupling coefficient profiles $k_{12}(z)$ and $k_{23}(z)$ are aligned along z-direction with reference to FIG. 3. The obvious benefit of this embodiment is that the structure with fully overlapped tapers implies even smaller transition length and smaller chip footprint. From fabrication point of view, the benefit is that the tapers on two vertical levels could be etched within one process step by using one lithographic mask as opposite to the case of FIG. 6A where two process steps are needed.

Figure 10:
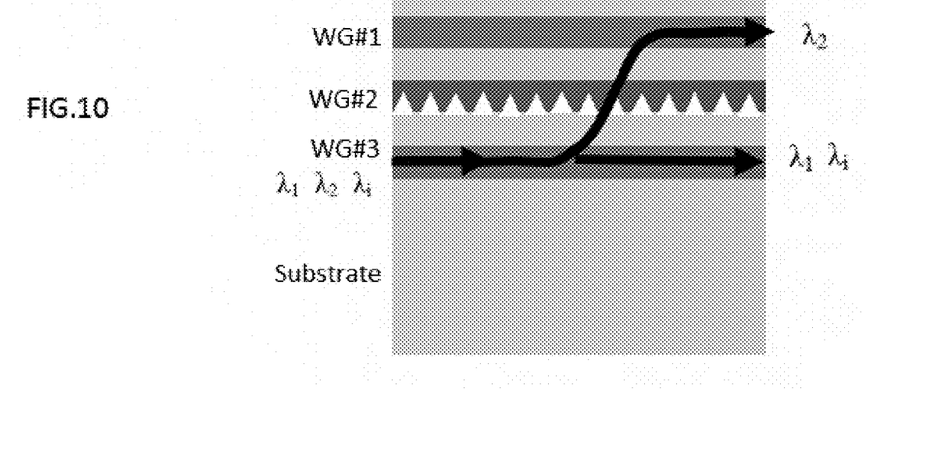
FIG. 10 presents a sectional view of InP based epi-structure of three vertical waveguides illustrating (de)multiplexing function of the CTWI platform in accordance with an aspect of the invention. As an option, the wavelength-selective grating is realized within the middle waveguide.

FIG. 10 illustrates the embodiment of the CTWI triple-guide structure in which (de)multiplexing function is realized. In this case, the transfer governed by the combination of coupling parameters of FIG. 3 is fulfilled only for the signal of one selected wavelength from a set of signal with different wavelength launched into the input waveguide. As illustrated in FIG. 10, from several wavelength $\lambda_1, \lambda_2 \ldots \lambda_i$, only the signal of $\lambda_2$ wavelength is transferred up by using CTAP mechanism while other wavelength stay in the original lower waveguide. As an option, the wavelength-selective grating could be realized within the middle waveguide.

Figure 11:
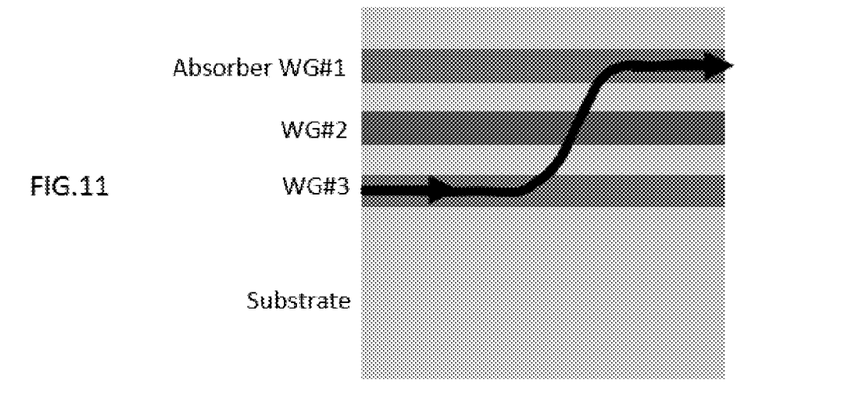
FIG. 11 presents a sectional view of InP based epi-structure of three vertical waveguides illustrating light transfer from the lower guide directly to the upper waveguide containing absorbing material.

FIG. 11 presents the embodiment of the CTWI triple-guide structure in which the upper waveguide WG#1 comprises light absorbing material as a waveguide core. In this case, the photo-detecting function is realized for the signal of particular wavelength, which is assumed to enter the structure along the bottom waveguide WG#3. The situation of FIG. 11 corresponds to the case of integrated diplexer chip, where the middle waveguide WG#2 plays the role of the laser core where the signal of different wavelength is generated and is transferred down to the bottom waveguide WG#3, then the signal is dispatched from the diplexer chip.

Figure 12:
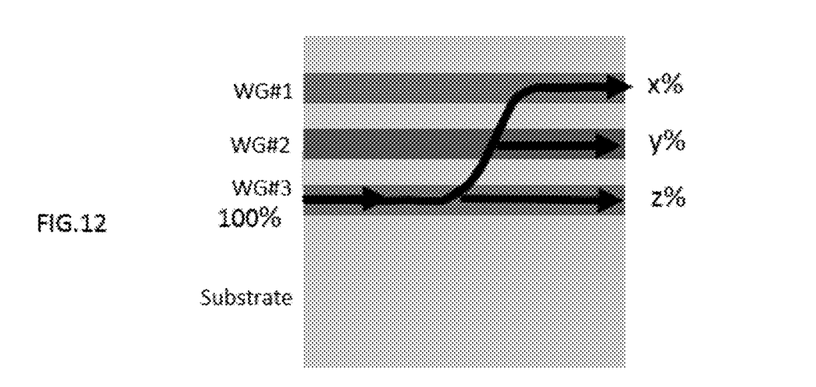
FIG. 12 presents a sectional view of InP based epi-structure of three vertical waveguides illustrating power splitting in predetermined ratios x %, y % and z %.

FIG. 12 shows the embodiment of the CTWI triple-guide structure in which the power splitting function is realized. Here, the signal is launched into the lower waveguide and the taper are arranged in such way that the coupling coefficients of FIG. 3 are tuned away from CTAP conditions. In this case, the combination of coupling coefficients (realized with help of taper shape parameters) allows the splitting of initial 100% of power in the desired proportions x % in WG#1, y % in WG#2 and z % in WG#3.

Figure 13A:
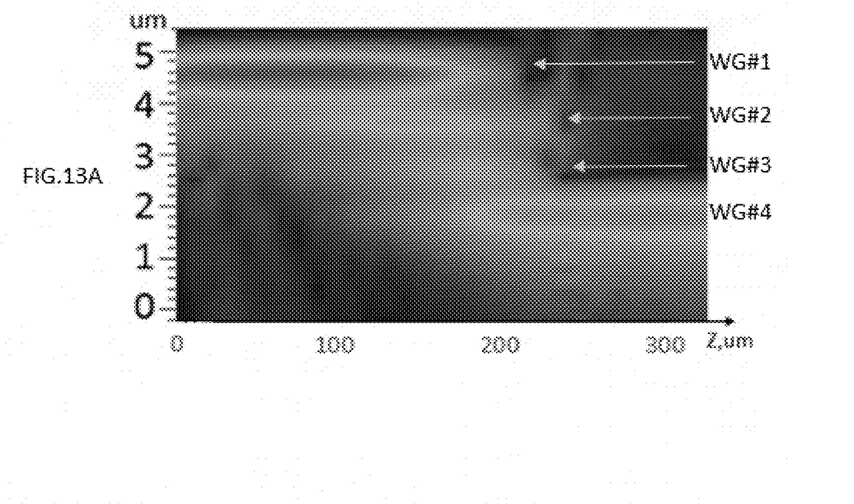
FIG. 13A is a graphical representation of light intensity as a function of distance in a four vertical waveguide structure when light from the upper tapered waveguide is transferred directly to the lower waveguide.
Figure 13B:
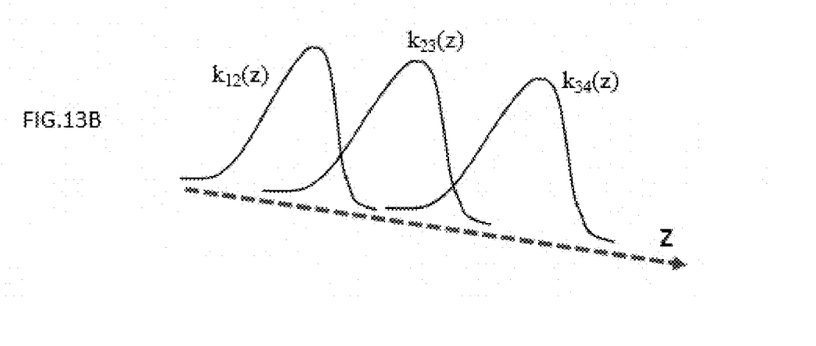
FIG. 13B illustrates overlap between the profiles of coupling coefficients for the case of four vertical waveguide structure analogous to the three-waveguide case shown in FIG. 6B.

FIG. 13A illustrates another embodiment of the invention wherein the CTWI structure comprises four vertical waveguides, where the lateral tapers are formed on the upper three waveguide levels. This case is an extension of the primary embodiment of FIG. 6A to the case of four waveguides. The theoretical aspects of the CTAP mechanism in the four waveguide case has been elaborated in the paper by H. S. Hristova, A. A. Rangelov, S. Gu'erin and N. V. Vitanov "Adiabatic evolution of light in an array of parallel curved optical waveguides" Phys. Rev. A 88, 013808 (2013). FIG. 13A shows light intensity distribution during power transfer from the upper WG#1 into the lower guide WG#4. FIG. 13B schematically show alignment of the coupling confident profiles along z-coordinate. Light power evolution along z-coordinate in terms of mode amplitudes of four waveguide demonstrates the same features as those shown in FIG. 5.

Figure 14:
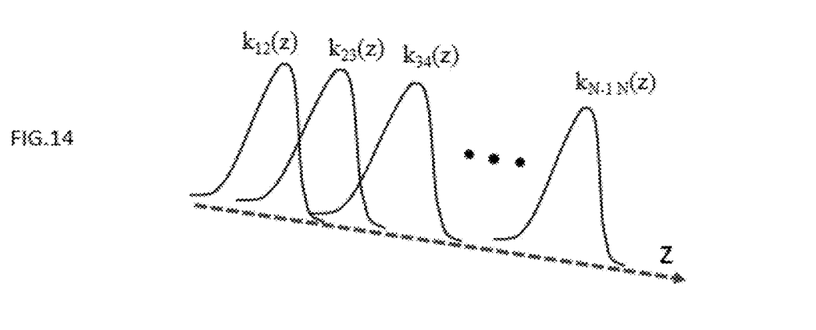
FIG. 14 gives a schematic presentation of the overlapped profiles of coupling coefficients for the case of CTWI structure comprising arbitrary number (N) of tapered waveguides.

FIG. 14 shows another embodiment of the invention, which is generalization of the CTWI structure to the case of arbitrary number, say N, of the vertical waveguides. In the case of N vertical waveguides, superimposed lateral tapers provide overlap of coupling coefficient profile like it is schematically shown in FIG. 14. Such overlap allows efficient transfer of light between desired waveguides in the vertical waveguide stack. It is worth noting that the studies of CTAP mechanism in the multiple waveguide arrays have demonstrated great potential of such structures for the efficient light mode exchange between different waveguides of the array, e.g. the papers by F. Dreisow, A. Szameit, M. Heinrich, R. Keil, S. Nolte, A. Tünnermann, and S. Longhi, "Adiabatic transfer of light via a continuum in optical waveguides", Opt. Letters Vol. 34, pp. 2405-2407 (2009) S. Longhi, "Coherent transfer by adiabatic passage in two-dimensional lattices", Annals of Physics, V. 348, pp. 161-175 (2014). The current invention makes use of the CTAP mechanism by developing CTWI platform suitable for multi-functional PIC performance and cost-efficient fabrication.

Figure 15:
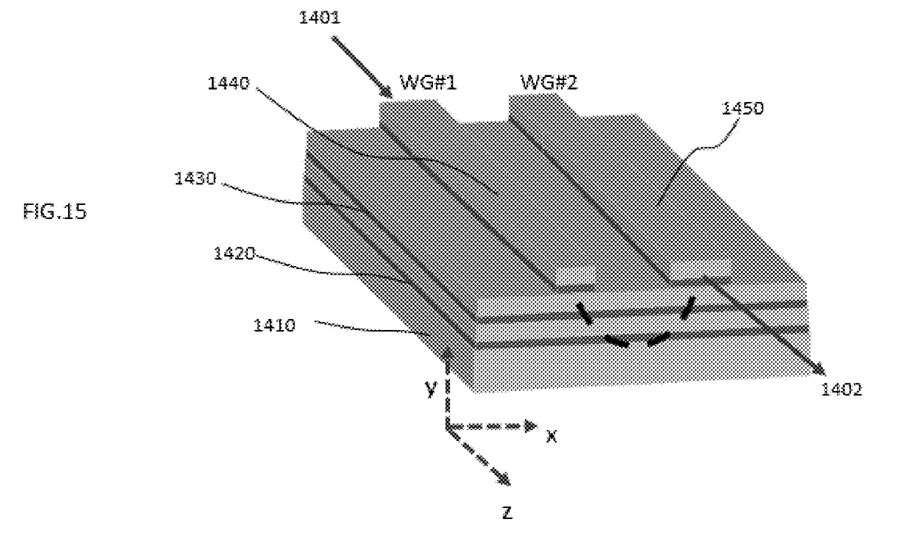
FIG. 15 gives a schematic view of the embodiment of the invention in form of multi-guide structure with two upper tapered waveguides wherein light signal selectively is transferred from one upper waveguide into another upper waveguide via lower structure.
Figure 16A:
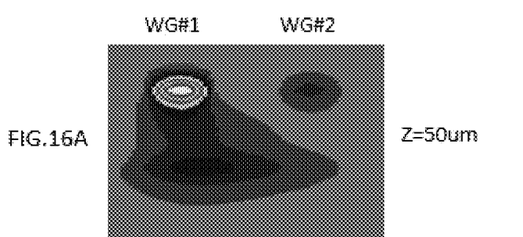
FIG. 16A is a graphical representation of the light intensity of the signal with TM polarization in XY cross-section close to the beginning of the tapered waveguide 1440 at propagation distance z=50 um.
Figure 16B:
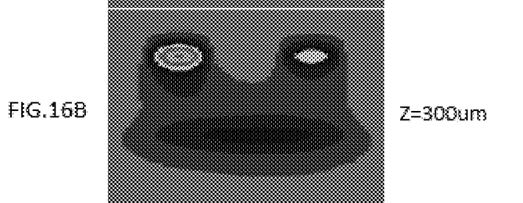
FIG. 16B is a graphical representation of the light intensity of the signal with TM polarization in XY cross-section close to the beginning of the tapered waveguide 1440 at propagation distance z=300 um.
Figure 16C:
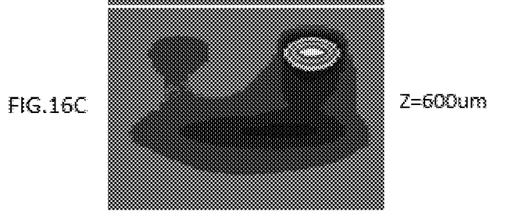
FIG. 16C is a graphical representation of the light intensity of the signal with TM polarization in XY cross-section close to the beginning of the tapered waveguide 1440 at propagation distance z=600 um.

FIG. 15 presents a schematic view of another embodiment of the invention in the form of the structure which comprises multiple vertical waveguide stack 1420, 1430 on top of which two tapered waveguides 1440 and 1450 are formed. Distinctive feature of this structure (and main difference from the prior art structures) is that two lateral waveguides do not interact directly with one another so that these two components are completely independent and their designs can be individually optimized. As for all cases of the CTWI platform, here more than two waveguides are involved in the transfer of light from one waveguide to another. Again, the main aspect of the invention is the overlap of coupling profiles which are completely superimposed in the case of structure of FIG. 15. Another aspect of the invention is that the structure of FIG. 15 is capable to implement the wavelength-de(multiplexing) and polarization-splitting functions. When, the same epi-stack as depicted in FIG. 7 is used, the tapered waveguides 1440 and 1450 can be formed with single fabrication step. If signal 1401 containing two polarizations (both TE and TM) is launched into waveguide 1440, at the end of the tapers, the signal containing TM polarization will be transferred into the tapered waveguide 1450 while the signal containing TE polarization will remain in the tapered waveguide 1440. Results of numerical simulations demonstrating polarization-splitting function are presented in FIG. 16A-16C. Namely, here the transfer of TM polarization from tapered waveguide 1440 into waveguide tapered 1450 is illustrated. Like in any generic CTAP light transfer, coupling between three modes is involved during flow of light of TM polarization from tapered waveguide 1440 into tapered waveguide 1450. These three modes are the TM fundamental modes of waveguides 1440, 1450 and the TM mode of the vertical waveguide stack formed by 1420 and 1430. TE polarization mode stays unchanged in the tapered waveguide 1440 because coupling conditions of the CTAP transfer are not satisfied by the taper dimensions of waveguides 1440 and 1450 for the modes of TE polarization.

Figure 17:
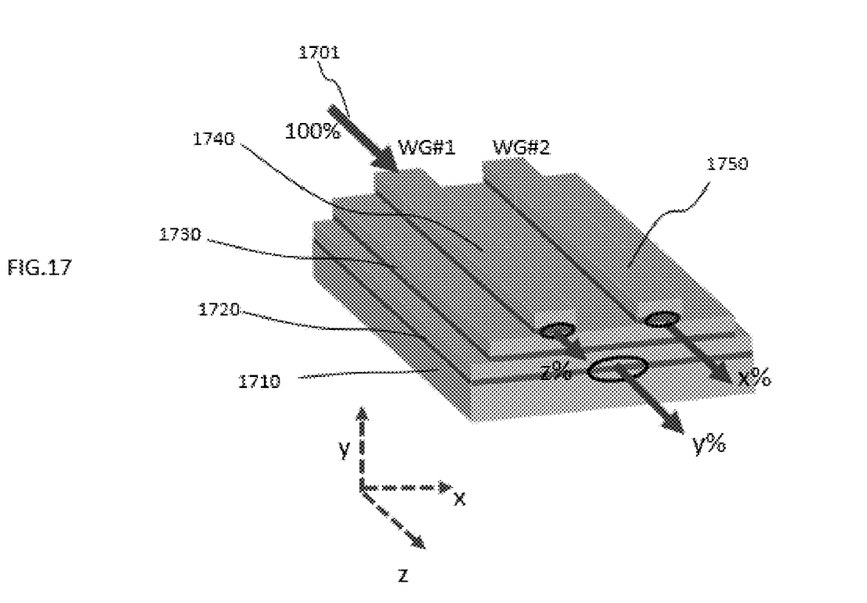
FIG. 17 gives a schematic view of the embodiment of the invention in form of multi-guide structure with two upper tapered waveguides wherein initial light signal is split into 3 parts according to predetermined ratios x %, y % and z %.

FIG. 17 illustrates another embodiment of the invention wherein the CTWI structure comprises one lower-level waveguide 1730 and two upper-level waveguides 1740 and 1750. The structure is designed to implement power-splitting function wherein the signal 1701 with 100% of power is launched into 1740 tapered waveguide and after propagating in the taper is split into three parts in the desired proportions: x % is transferred into second upper-level waveguide 1750, y % is transferred into the lower-level waveguide 1730, and z % remains in the initial upper-level waveguide 1740.

Figure 18:
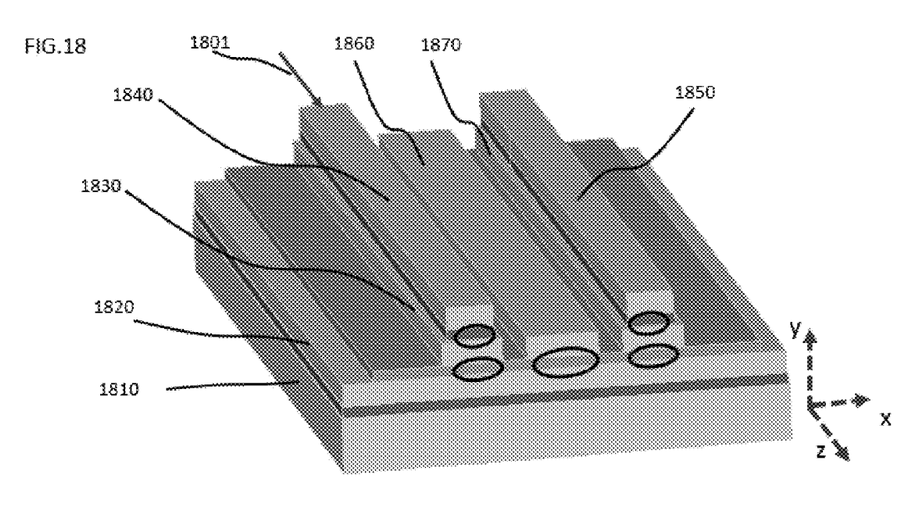
FIG. 18 presents a schematic view of the embodiment of the invention in form of multi-guide structure comprising plurality of vertical and lateral waveguides, wherein coupling schemes incorporating CTAP mechanism are realized both vertically and laterally.

FIG. 18 gives schematic view of another embodiment of the invention wherein the CTWI structure comprises plurality of vertical and lateral waveguides. The waveguides 1830 and 1840 (as well as 1850 and 1870) are coupled vertically, whereas the waveguides 1830, 1860 and 1870 are coupled laterally. The structure is capable to implement variety of function such as signal-routing, power-splitting, wavelength-(de)multiplexing as well as polarization splitting depending on coupling conditions governed by the taper's shapes. Depending on the needs of design, the signal 1801, which is launched into 1840 tapered waveguide, after propagating in the taper can be transferred in any of the waveguides 1830, 1850, 1860 or 1870 by using the CTAP mechanism illustrated by overlapped profiles of FIG. 14.

What is claimed is:

1. An integrated-photonics waveguide structure comprising:
    a vertical waveguide stack comprising at least three vertically-stacked waveguides disposed on a substrate including an uppermost waveguide, a lowermost waveguide, and at least one middle waveguide; wherein
    the vertical waveguide stack comprises one of:
        (a) an active optical waveguide as the uppermost waveguide, a passive optical waveguide as the at least one middle waveguide, an active optical waveguide as the lowermost waveguide;
        (b) a laser guide as the uppermost waveguide, a passive guide as the at least one middle waveguide, a modulator guide as the lowermost waveguide;
        (c) a photodetector guide as the uppermost waveguide, a laser guide as the at least one middle waveguide, a passive guide as the lowermost waveguide; and
        (d) a photodetector guide as the uppermost waveguide, a passive guide as the at least one middle waveguide, a passive guide as the lowermost waveguide;
    the vertical waveguide stack comprises semiconductor quantum well materials as waveguide cores and n-doped and p-doped semiconductor materials as waveguide cladding;
    the waveguides terminate with lateral tapers which are formed in a direction of light propagation;
    the lateral tapers produce optical coupling between the waveguides on adjacent vertical layers;
    wherein superposition of lateral tapers corresponds to an overlap of coupling profiles which in turn corresponds to a condition of coherent tunneling by adiabatic passage; and
    the condition of coherent tunneling by adiabatic passage corresponds to transfer of light from one outermost waveguide of the vertical waveguide stack directly to another outermost waveguide of the vertical waveguide stack whilst bypassing intermediate waveguides.

2. The integrated-photonics waveguide structure according to claim 1, wherein the structure implements a wavelength demultiplexing function:
    the waveguide structure comprises a set of at least two overlapped lateral tapers formed on different vertical layers;
    wherein optical signals with different wavelengths are launched into the lowermost waveguide; and
    said demultiplexing function means that said set of overlapped tapers couples one optical signal with a predetermined wavelength from the lowermost waveguide directly into the uppermost waveguide.

3. The integrated-photonics waveguide structure according to claim 2, wherein grating is formed within the middle waveguide and
    comprises alternative sections containing first and second materials having different refractive indices, wherein
    the first material has a higher refractive index than the second material; and
    the second material has lower refractive index than the first material.

4. An integrated-photonics waveguide structure comprising:
    a stack of at least two vertical waveguides disposed on a substrate,
    wherein the stack supports an optical mode which is a stack fundamental mode;
    a first ridge waveguide formed on top of the stack and having a section with a first lateral taper, wherein the first ridge waveguide supports an optical mode which is a fundamental mode of the first ridge; and
    a second ridge waveguide formed on top of the stack, and having a section with a second lateral taper, wherein the
    second ridge waveguide supports an optical mode which is a fundamental mode of the second ridge;
    wherein the first and second ridge waveguides have a same length in a direction of light propagation and are geometrically arranged to have optical axes that are parallel.

5. The integrated-photonics waveguide structure according to claim 4, wherein the structure implements a polarization splitting function, wherein an initial optical signal of combined TE+TM polarization state launched into the first ridge waveguide is split after propagation within the first lateral taper into two signals: a first signal with prevailing TE polarization remains in the first ridge waveguide and a second signal with prevailing TM polarization transfers into the second ridge waveguide;
    wherein optical coupling between three optical modes is involved: the fundamental mode of the first ridge, the fundamental mode of the second ridge and the stack fundamental mode,
    wherein optical coupling between the fundamental mode of the first ridge and the stack fundamental mode is implemented by means of the first lateral taper, wherein optical coupling between the fundamental mode of the second ridge and the stack fundamental mode is implemented by means if the second lateral taper, and wherein there is no direct coupling between the fundamental mode of the first ridge and the fundamental mode of the second ridge.

6. The integrated-photonics waveguide structure according to claim 4, wherein the structure implements a power splitting function wherein an initial optical signal with 100% of power launched into the first ridge waveguide is split after propagation within the first lateral taper into three signals: a first signal with z % of initial power remains in the first ridge waveguide; a second signal with x % of initial power is transferred in the second ridge waveguide; and a third signal with y % of initial power is coupled after transfer in the said stack fundamental mode, wherein x+y+z=100, optical coupling between the fundamental mode of the first ridge and the stack fundamental mode is implemented by means of the first lateral taper, optical coupling between the fundamental mode of the second ridge and the stack fundamental mode is implemented by means of the second lateral taper, and there is no direct coupling between the fundamental mode of the first ridge and the fundamental mode of the second ridge.

7. An integrated-photonics waveguide structure comprising:

a plurality of vertically and laterally coupled waveguides that are geometrically arranged to have optical axes that are parallel, wherein:
one particular waveguide is a part of vertical and lateral arrayed structures;
light transfer occurs simultaneously both laterally and vertically due to properly designed taper shapes;
light transfer involves three or more waveguides in accordance with a CTAP mechanism;
direct transfer from one desired waveguide into another desired waveguide is realized;
a polarization splitting function is realized;
a wavelength (de)multiplexing function is realized; and
a power splitting function is realized.

8. The integrated-photonics waveguide structure according to claim 1, wherein the waveguide structure comprises Indium Phosphide (InP) and InP-based ternary and quaternary materials.

9. The integrated-photonics waveguide structure according to claim 1, wherein the waveguide structure comprises Gallium Arsenide (GaAs) and AlGaAs-based materials.

10. The integrated-photonics waveguide structure according to claim 1, wherein the waveguide structure comprise silicon and silicon oxide materials.

11. The integrated-photonics waveguide structure according to claim 1, wherein the waveguide structure comprises a combination of different materials including GaAs, InP, GaAs-based ternary and quaternary materials, InP-based ternary and quaternary materials, silicon and silicon oxide materials, silicon nitride and polymer materials.

12. The integrated-photonics waveguide structure according to claim 1, wherein the structure comprises composite materials such that layers of materials of different nature are brought in close proximity by wafer-bounding, or nano-membrane stacking.

13. The integrated-photonics waveguide structure according to claim 4, wherein the waveguide structure comprises Indium Phosphide (InP) and InP-based ternary and quaternary materials.

14. The integrated-photonics waveguide structure according to claim 7, wherein the waveguide structure comprises Indium Phosphide (InP) and InP-based ternary and quaternary materials.

15. The integrated-photonics waveguide structure according to claim 4, wherein the waveguide structure comprises Gallium Arsenide (GaAs) and AlGaAs-based materials.

16. The integrated-photonics waveguide structure according to claim 7, wherein the waveguide structure comprises Gallium Arsenide (GaAs) and AlGaAs-based materials.

17. The integrated-photonics waveguide structure according to claim 4, wherein the waveguide structure comprises silicon and silicon oxide materials.

18. The integrated-photonics waveguide structure according to claim 7, wherein the waveguide structure comprises silicon and silicon oxide materials.

19. The integrated-photonics waveguide structure according to claim 4, wherein the waveguide structure comprises a combination of different materials including GaAs, InP, GaAs-based ternary and quaternary materials, InP-based ternary and quaternary materials, silicon and silicon oxide materials, silicon nitride and polymer materials.

20. The integrated-photonics waveguide structure according to claim 7, wherein the waveguide structure comprises a combination of different materials such as GaAs, InP, GaAs-based ternary and quaternary materials, InP-based ternary and quaternary materials, silicon and silicon oxide materials, silicon nitride and polymer materials.

21. The integrated-photonics waveguide structure according to claim 4, wherein the structure comprises composite materials such that layers of materials of different nature are brought in close proximity by wafer-bounding, or nano-membrane stacking.

22. The integrated-photonics waveguide structure according to claim 7, wherein the structure comprise composite materials such that layers of materials of different nature are brought in close proximity by wafer-bounding, or nano-membrane stacking.

* * * * *